(12) United States Patent
Xia et al.

(10) Patent No.: US 11,964,460 B1
(45) Date of Patent: Apr. 23, 2024

(54) PULLING RIB AND MANUFACTURING PROCESS THEREOF AND INFLATABLE PRODUCT

(71) Applicant: ZHEJIANG NATURAL OUTDOOR GOODS INC., Taizhou (CN)

(72) Inventors: Yonghui Xia, Taizhou (CN); Zhijian Ma, Taizhou (CN); Mengzhi Zhou, Taizhou (CN)

(73) Assignee: ZHEJIANG NATURAL OUTDOOR GOODS INC., Taizhou (CN)

( * ) Notice: Subject to any disclaimer, the term of this patent is extended or adjusted under 35 U.S.C. 154(b) by 0 days.

(21) Appl. No.: 18/304,827

(22) Filed: Apr. 21, 2023

(30) Foreign Application Priority Data

Feb. 7, 2023 (CN) .......................... 202310136732.2

(51) Int. Cl.
| | |
|---|---|
| *B32B 5/26* | (2006.01) |
| *A47C 27/08* | (2006.01) |
| *A63H 27/10* | (2006.01) |
| *B32B 1/00* | (2006.01) |
| *B32B 5/02* | (2006.01) |
| *B32B 7/12* | (2006.01) |
| *B32B 37/12* | (2006.01) |

(52) U.S. Cl.
CPC ................ *B32B 5/263* (2021.05); *B32B 1/00* (2013.01); *B32B 5/024* (2013.01); *B32B 7/12* (2013.01); *B32B 37/1292* (2013.01); *A47C 27/081* (2013.01); *A63H 27/10* (2013.01); *A63H 2027/1025* (2013.01)

(58) Field of Classification Search
CPC .......... A47C 27/081; A63H 2027/1025; A63H 27/10; B32B 1/00; B32B 37/1292; B32B 5/024; B32B 5/263; B32B 7/12; B29C 65/48; B29C 65/50; B29C 65/5057; B29C 66/21; B29C 66/232; B29C 66/729; B29C 66/474

USPC ... 156/60, 65, 145, 147, 148, 156, 196, 217, 156/218, 250, 256, 259, 264, 265, 290, 156/291, 292, 297, 299, 300; 5/706, 711, 5/710, 712, 682, 684, 655.3, 707, 681; 36/29, 35 B; 2/413, DIG. 3

See application file for complete search history.

(56) References Cited

U.S. PATENT DOCUMENTS 4,137,111 A * 1/1979 Hansen ................ A47G 9/0253
428/101
4,823,417 A * 4/1989 Fukuichi .............. A47C 27/087
5/655.3

(Continued)

*Primary Examiner* — Michael A Tolin
*Assistant Examiner* — Brian R Slawski
(74) *Attorney, Agent, or Firm* — Haynes and Boone, LLP

(57) ABSTRACT

The present disclosure provides a pulling rib and a pulling rib manufacturing process thereof and an inflatable product, relating to the technical field of inflatable products. The pulling rib manufacturing process includes the following steps: weaving a dense weaving region and a patterned weaving region in sequence according to preset sizes, wherein a weaving density of the patterned weaving region is lower than that of the dense weaving region; applying glue locally along a surface of the dense weaving region; and after applying the glue, cutting the dense weaving region according to requirements to form pulling ribs, wherein the patterned weaving region between any two adjacent sections of the dense weaving regions is the height of the pulling ribs.

12 Claims, 10 Drawing Sheets

(56) References Cited

U.S. PATENT DOCUMENTS

| | | | | |
|---|---|---|---|---|
| 6,001,199 A | * | 12/1999 | Colson | B29C 66/91431 |
| | | | | 156/291 |
| 2005/0039346 A1 | * | 2/2005 | Thomas | D04B 21/16 |
| | | | | 36/35 B |
| 2012/0000017 A1 | * | 1/2012 | Xia | A47C 27/087 |
| | | | | 5/706 |
| 2014/0237727 A1 | * | 8/2014 | Xia | A47C 27/087 |
| | | | | 5/711 |
| 2015/0335164 A1 | * | 11/2015 | Liu | F24F 1/022 |
| | | | | 156/278 |
| 2017/0238718 A1 | * | 8/2017 | Xia | B29C 65/04 |
| 2017/0303695 A1 | * | 10/2017 | Xia | A47C 27/081 |
| 2021/0127849 A1 | * | 5/2021 | Li | A47C 27/12 |
| 2021/0212482 A1 | * | 7/2021 | Li | B32B 7/05 |

* cited by examiner

PULLING RIB AND MANUFACTURING PROCESS THEREOF AND INFLATABLE PRODUCT

CROSS-REFERENCE TO RELATED APPLICATION

The present disclosure claims priority to Chinese Patent Application No. 2023101367322 filed on Feb. 7, 2023 with the Chinese Patent Office, and entitled "Pulling Rib and Manufacturing Process thereof and Inflatable Product", the contents of which are incorporated herein by reference in entirety.

TECHNICAL FIELD

The present disclosure relates to the technical field of inflatable products, and particularly to a pulling rib (a tiepiece) and a manufacturing process thereof and an inflatable product.

BACKGROUND ART

The so-called inflatable product refers to: a product with a specific shape which is formed by providing an inflatable cavity enclosed by a plurality of peripheral pieces, and then inflating the inflatable cavity. The inflatable products have been widely used for their advantages of being comfortable, easy to carry and soft. The inflatable products include a plurality of products such as inflatable beds, inflatable sofas, inflatable toys, and inflatable castles. Among those inflatable products, the peripheral pieces of most of them are usually made of soft materials, therefore, the inflatable products will form a sphere, such as a balloon, during inflation.

In the prior art, in order to avoid the inflatable product from becoming a sphere after inflation, people usually arrange pulling ribs inside the inflatable cavity, in which the pulling ribs are connected with the peripheral pieces and can serve supporting and shaping functions, therefore, the inflatable product can form a specific shape according to positions of the pulling ribs being arranged inside the inflatable cavity, the number of pulling ribs, and the enclosing shape of the peripheral pieces.

However, in order to make existing inflatable products comfortable, stable, and durable, many pulling ribs are usually added to the interior of the products. The existing manufacturing process for the pulling ribs is to glue the fabric completely (that is, the surface is covered with TPU/PVC film completely), and then the pulling ribs are manufactured. However, the TPU (thermoplastic polyurethanes) gluing is costly, pure PVC (polyvinyl chloride) without gluing is relatively expensive and the weight thereof is relatively large. Therefore, applying complete gluing will invisibly increase the cost and weight of inflatable products; and in addition, the pulling ribs may block the air current circulation when inflating and deflating, and affect the inflating and deflating efficiency.

SUMMARY

The present disclosure aims at providing a pulling rib and a manufacturing process thereof and an inflatable product, so as to solve the technical problems in the prior art that complete gluing to surfaces of the pulling ribs increases the cost and weight of the inflatable products, and the pulling ribs block the air current circulation and affect the inflating and deflating efficiency.

The present disclosure provides a pulling rib manufacturing process, including the following steps:
weaving a dense weaving region and a patterned weaving region in sequence according to preset sizes, wherein a weaving density of the patterned weaving region is lower than that of the dense weaving region;
applying glue locally along a surface of the dense weaving region; and
after applying the glue, cutting the dense weaving region according to requirements to form pulling ribs, wherein the patterned weaving region between any two adjacent sections of the dense weaving regions is the height of the pulling ribs.

In an embodiment of the present disclosure, the step of applying glue locally along a surface of the dense weaving region further includes:
determining a local gluing range according to a range of welding point area set for an inflatable product;
locally applying glue to any two adjacent groups of the dense weaving regions symmetrically about a center line of the patterned weaving region; and
drying the locally applied glue to form a bonding layer.

In an embodiment of the present disclosure, the local gluing includes local point gluing, local line gluing, local surface gluing, local tape-casting or local film pasting.

In an embodiment of the present disclosure, the following steps are further included:
weaving to form two sections of the dense weaving regions, and weaving the patterned weaving region between the two sections of the dense weaving regions; and
cutting the two sections of the dense weaving regions to form the C-shaped pulling ribs of a long-strip mesh structure.

In an embodiment of the present disclosure, the step of cutting the dense weaving region according to requirements further includes:
weaving the dense weaving region and the patterned weaving region in sequence in an interval weaving manner;
cutting along a center line of the dense weaving region; and
using two sections of the cut dense weaving regions on two opposite sides of the patterned weaving region as the structure of the pulling ribs, so as to form the pulling ribs of the long-strip mesh structure.

In an embodiment of the present disclosure, the following steps are further included:
weaving to form three sections of the dense weaving regions, and weaving the patterned weaving region between any two adjacent sections of the dense weaving regions;
forming a first-section dense weaving region, a second-section dense weaving region, and a third-section dense weaving region by the three sections of the dense weaving regions, respectively;
cutting along center lines of the first-section dense weaving region and the third-section dense weaving region, and equally cutting a local gluing region;
edge-sealing the cut first-section dense weaving region and the cut third-section dense weaving region to form an annular pulling rib, wherein one end of the annular pulling rib is respectively the first-section dense weaving region and the third-section dense weaving region after cutting and edge-sealing, and the other end of the annular pulling rib is the second-section dense weaving region; and weaving the dense weaving region and the patterned weaving region in sequence in an interval weaving manner to form the cyclic weaving.

In an embodiment of the present disclosure, the patterned weaving region is a mesh-weaving-process-structure region; alternatively, the patterned weaving region includes the reinforcing ribs and the patterned regions formed by weaving, the patterned regions form hollowed patterned structures, a plurality of reinforcing ribs are provided, and the reinforcing ribs are woven along edges of the patterned regions.

A pulling rib provided in the present disclosure, obtained by manufacturing with the pulling rib manufacturing process.

An inflatable product provided in the present disclosure, including: a cover cloth, a base cloth, and the pulling rib, wherein the pulling rib is located between the cover cloth and the base cloth, gluing layers are provided at intervals along surfaces of two sides of the pulling rib, and the pulling rib is connected with the cover cloth and the base cloth respectively through gluing layers on two sides by a hot welding process; and a plurality of pulling ribs are provided, and the plurality of pulling ribs are provided at intervals along an extending direction perpendicular to the pulling ribs.

In an embodiment of the present disclosure, a side wall is further included, wherein the side wall is circumferentially disposed along an edge of the cover cloth, the side wall is connected to the cover cloth and the base cloth, respectively, and an inflation space for accommodating the pulling ribs is formed by the cover cloth, the side wall, and the base cloth.

The pulling rib manufacturing process provided in the present disclosure includes the following steps: weaving the dense weaving region and the patterned weaving region in sequence according to preset sizes, wherein the weaving density of the patterned weaving region is lower than that of the dense weaving region; applying glue locally along the surface of the dense weaving region; and after applying the glue, cutting the dense weaving region according to requirements to form the pulling ribs, wherein the patterned weaving region between any two adjacent sections of the dense weaving regions is height of the pulling ribs. By adopting the weaving way and using different weaving densities, the dense weaving region and the patterned weaving region are formed, so that the formed pulling ribs have the advantages of strong toughness, light weight, and ventilation, and the surface of the dense weaving region forming the surfaces of the pulling ribs can also be locally glued, which saves the cost, reduces the weight, avoids the material waste, and solves the technical problems in the prior art that complete gluing to the surfaces of the pulling ribs increases the cost and weight of the inflatable products, and the pulling ribs block the air current circulation and affect the inflating and deflating efficiency.

BRIEF DESCRIPTION OF DRAWINGS

In order to more clearly illustrate technical solutions in embodiments of the present disclosure or the prior art, drawings which need to be used in the description of the embodiments or the prior art will be introduced briefly below. Apparently, the drawings in the following description are for some embodiments of the present disclosure. A person ordinarily skilled in the art still could obtain other drawings in light of these drawings, without using any creative efforts.

Figure 1:
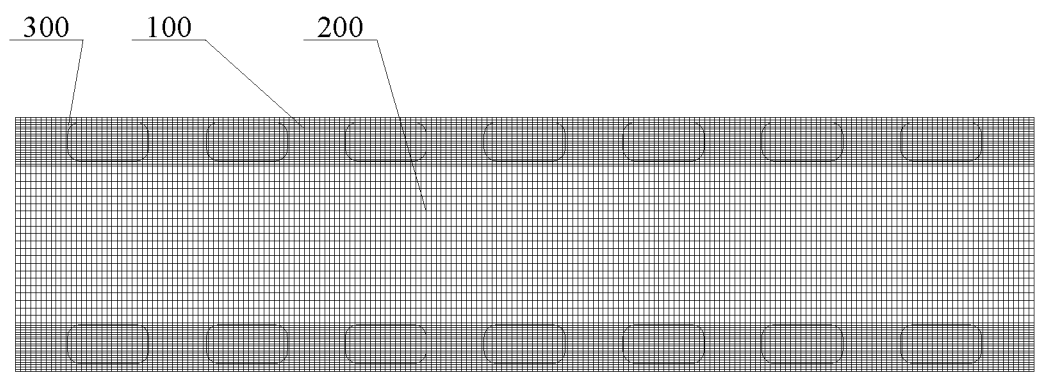
FIG. 1 is a structural schematic diagram of a weaving region of C-shaped pulling ribs during a pulling rib manufacturing process provided in an embodiment of the present disclosure.
Figure 2:
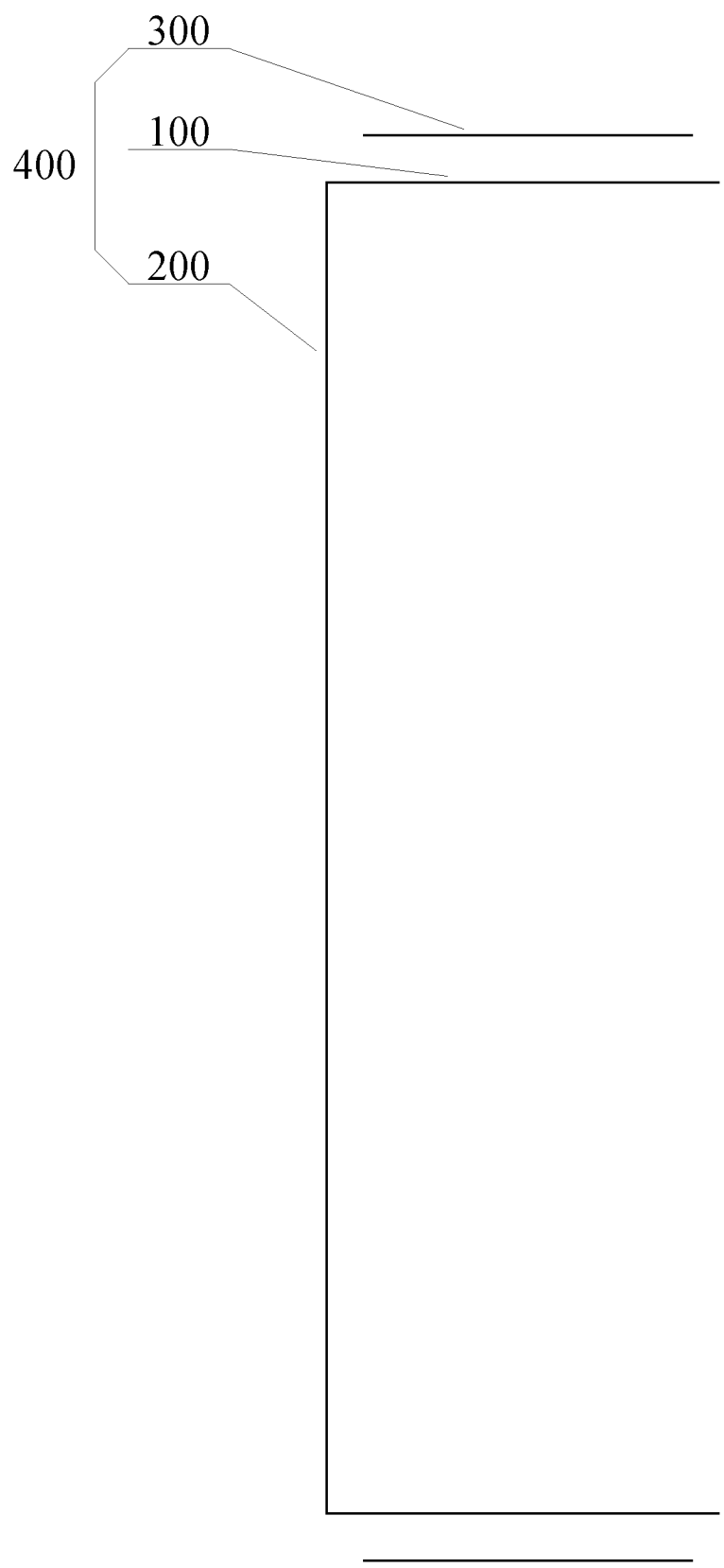
FIG. 2 is a structural schematic diagram of the C-shaped pulling rib made by the pulling rib manufacturing process provided in an embodiment of the present disclosure.
Figure 3:
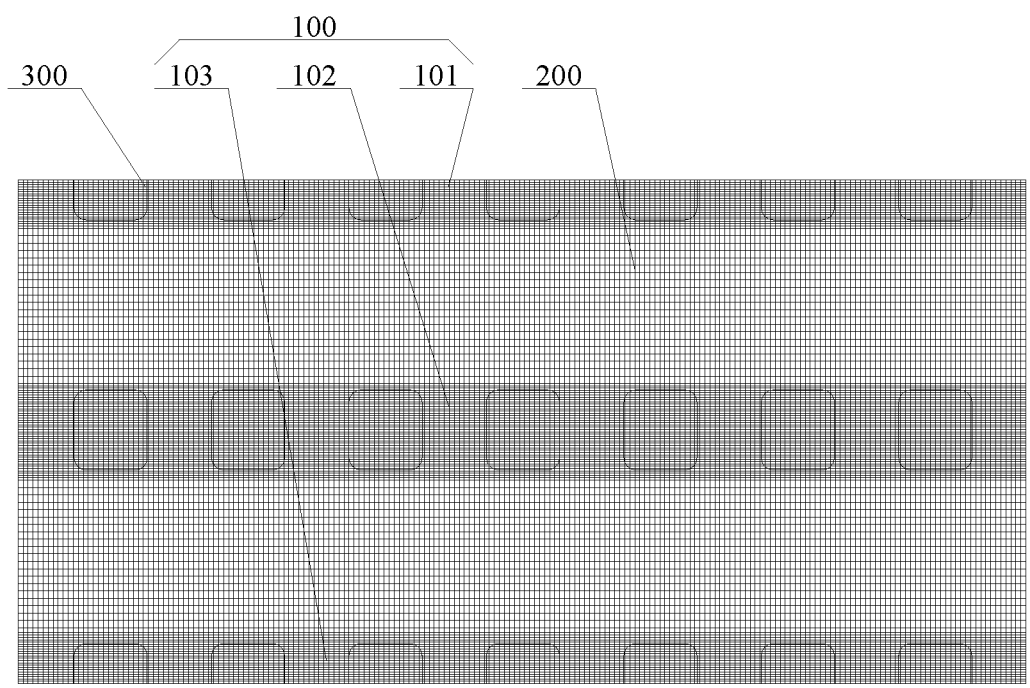
FIG. 3 is a structural schematic diagram of a weaving region of annular pulling ribs during the pulling rib manufacturing process provided in an embodiment of the present disclosure.
Figure 4:
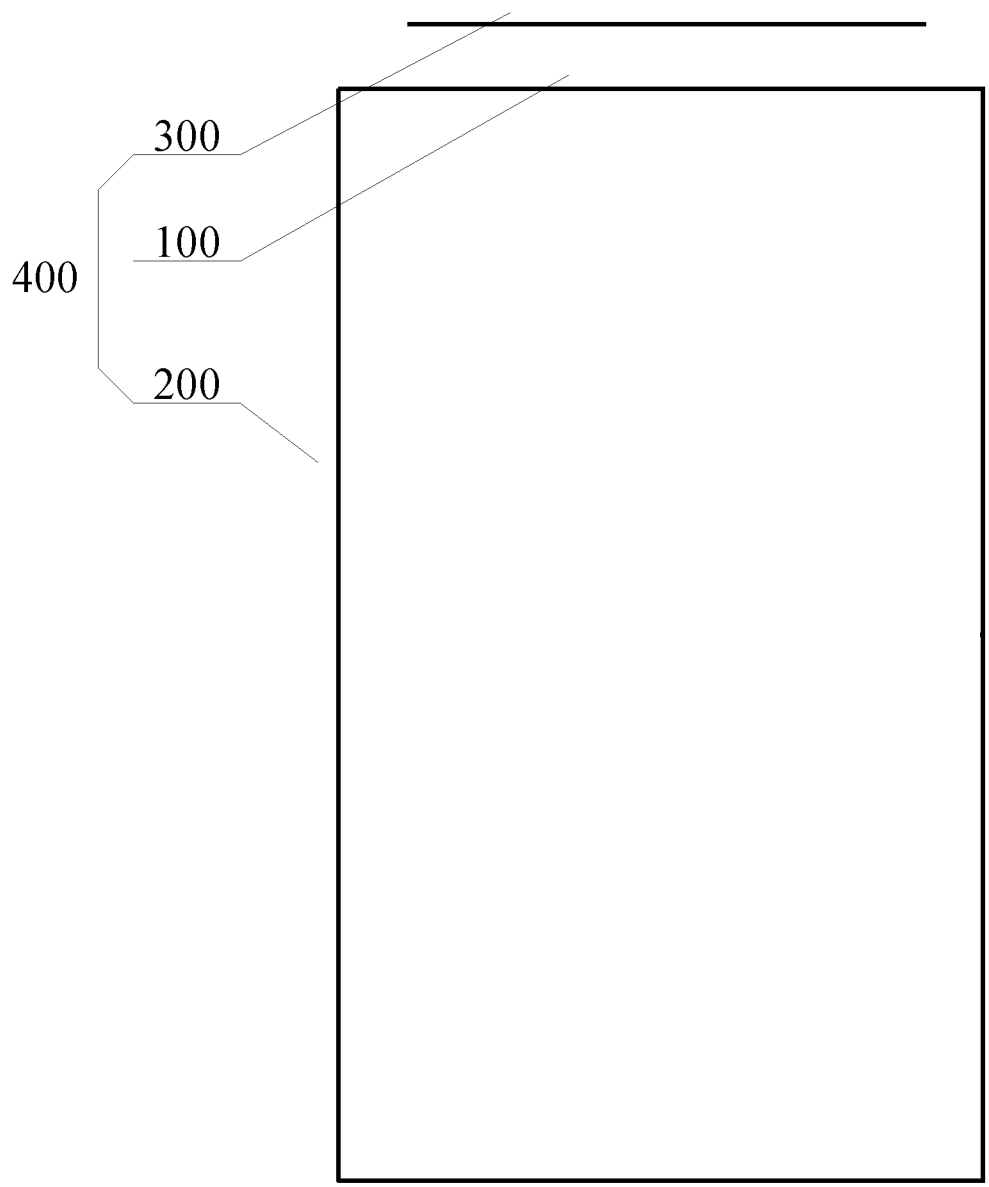
FIG. 4 is a structural schematic diagram of the annular pulling rib manufactured through the pulling rib manufacturing process provided in an embodiment of the present disclosure.
Figure 5:
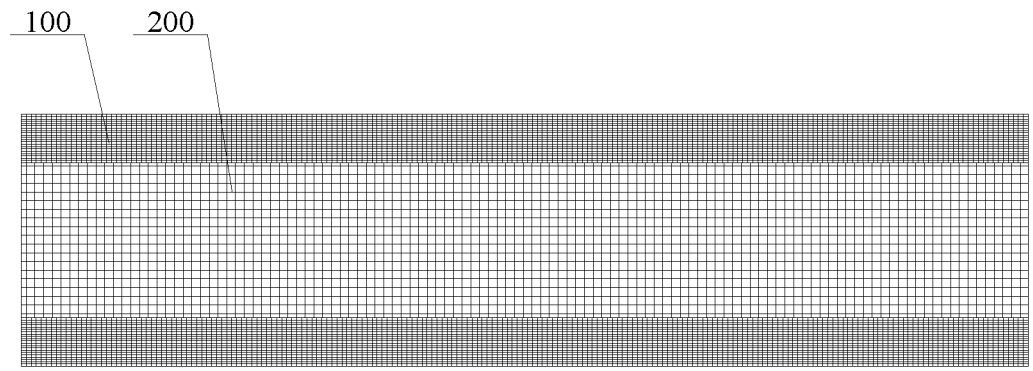
FIG. 5 is a structural schematic diagram of a patterned weaving region of square grids through the pulling rib manufacturing process provided in an embodiment of the present disclosure.
Figure 6:
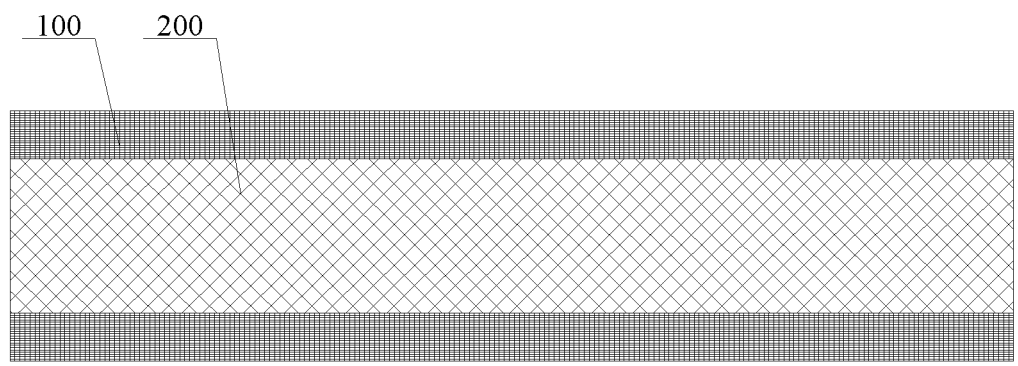
FIG. 6 is a structural schematic diagram of a patterned weaving region of rhombus grids through the pulling rib manufacturing process provided in an embodiment of the present disclosure.
Figure 7:
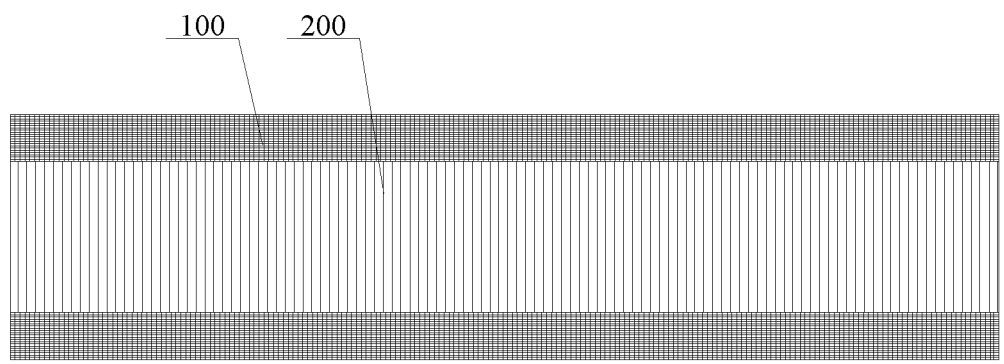
FIG. 7 is a structural schematic diagram of a patterned weaving region of vertical grids through the pulling rib manufacturing process provided in an embodiment of the present disclosure.
Figure 8:
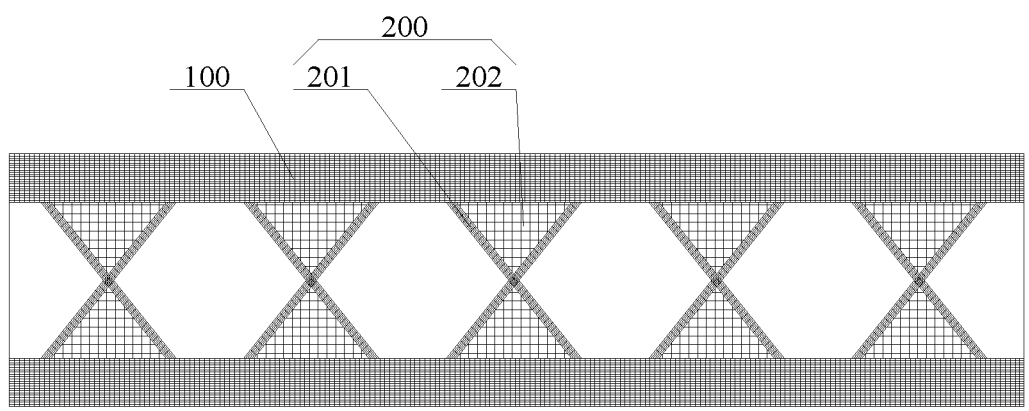
FIG. 8 is a structural schematic diagram of a patterned weaving region of hollowed patterned structure through the pulling rib manufacturing process provided in an embodiment of the present disclosure.
Figure 9:
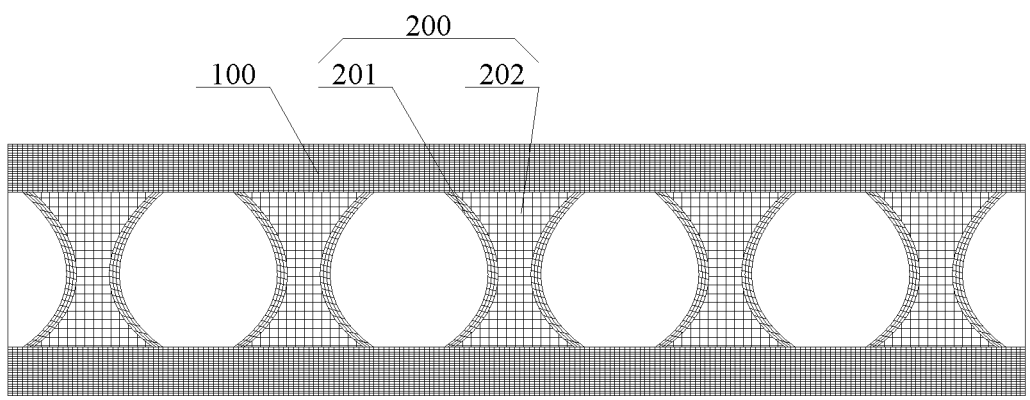
FIG. 9 is a structural schematic diagram of a patterned weaving region of another hollowed patterned structure through the pulling rib manufacturing process provided in an embodiment of the present disclosure.
Figure 10:
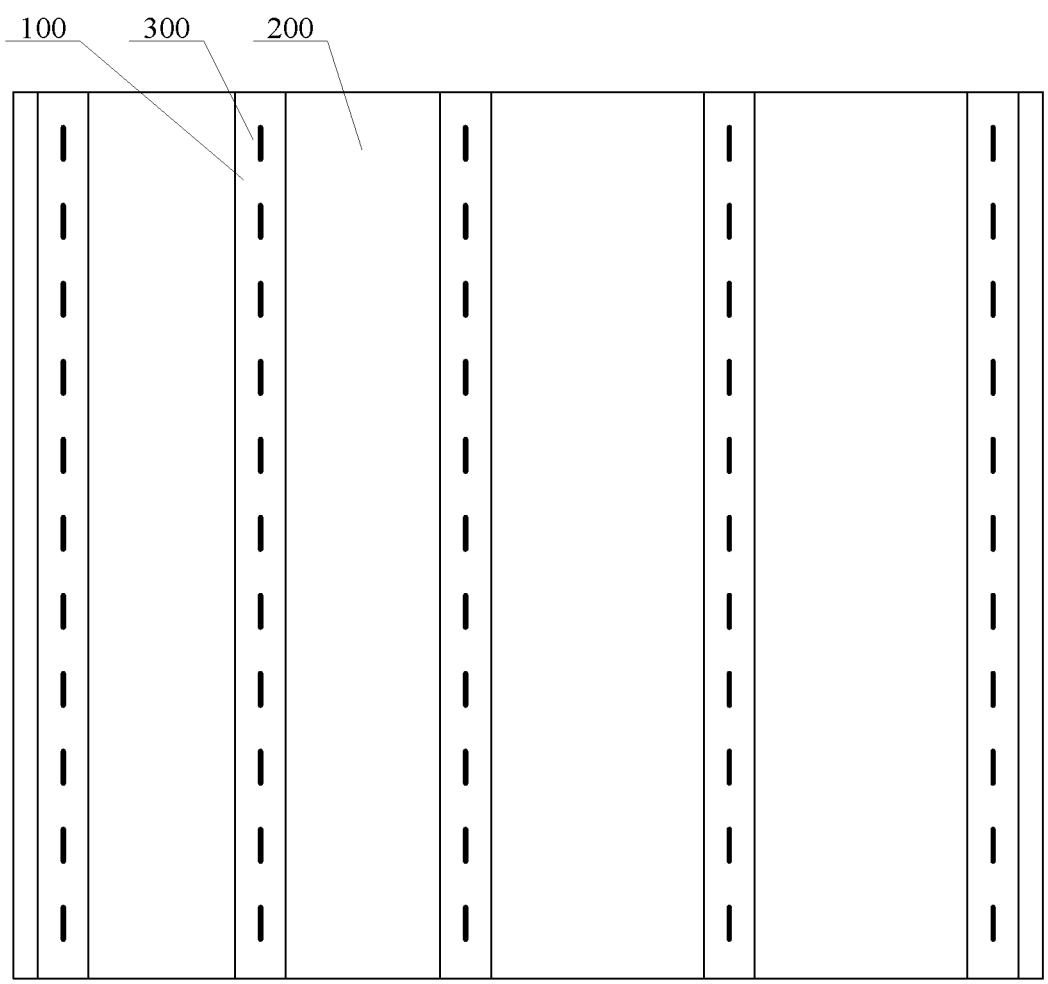
FIG. 10 is a structural schematic diagram of locally gluing a dense weaving region through the pulling rib manufacturing process provided in an embodiment of the present disclosure.
Figure 11:
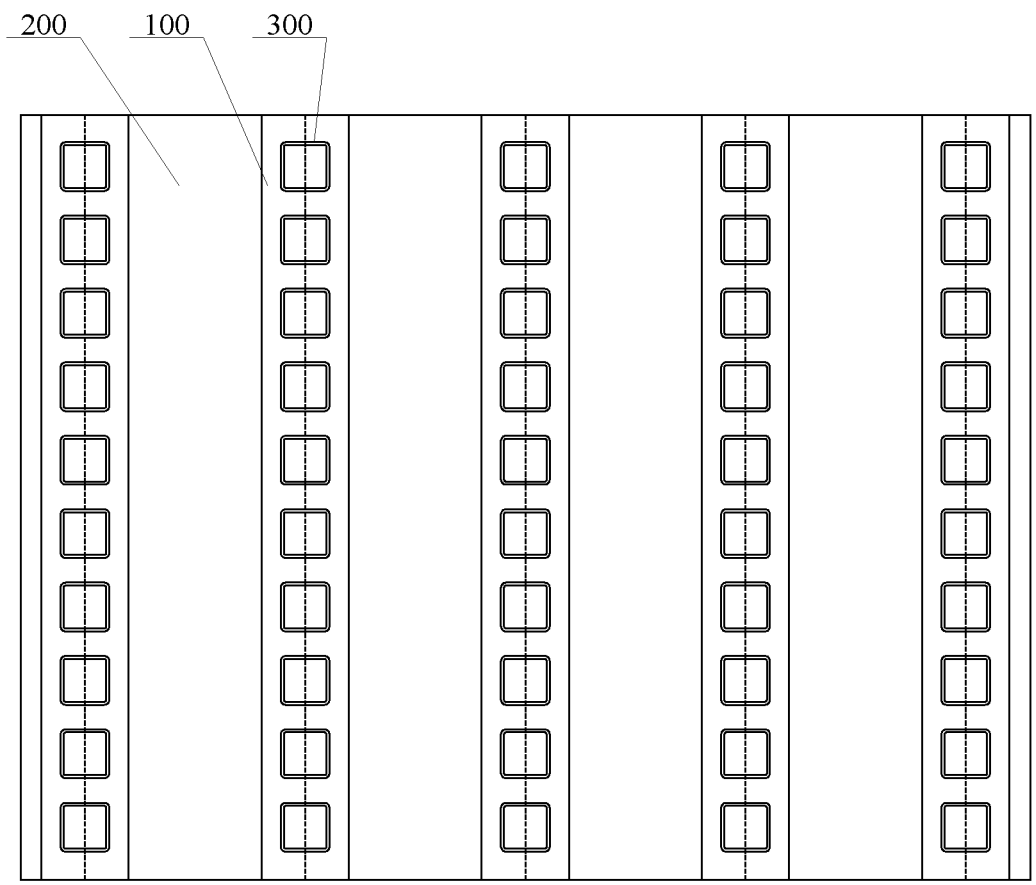
FIG. 11 is a structural schematic diagram of another embodiment of locally gluing the dense weaving region through the pulling rib manufacturing process provided in an embodiment of the present disclosure.

Reference signs: 100-dense weaving region; 101-first-section dense weaving region; 102-second-section dense weaving region; 103-third-section dense weaving region; 200-patterned weaving region; 201-reinforcing rib; 202-patterned region; 300-bonding layer; 400-pulling rib; 500-cover cloth; 600-base cloth; 700-side wall.

DETAILED DESCRIPTION OF EMBODIMENTS

Technical solutions of the present disclosure will be described below clearly and completely in connection with embodiments. Apparently, the described embodiments are only some but not all embodiments of the present disclosure. All of other embodiments, obtained by a person ordinarily skilled in the art based on the embodiments of the present disclosure without using any creative efforts, shall fall into the scope of protection of the present disclosure.

As shown in FIG. 1-FIG. 14, a pulling rib manufacturing process provided in the present embodiment includes the following steps: weaving a dense weaving region 100 and a patterned weaving region 200 in sequence according to preset sizes, wherein a weaving density of the patterned weaving region 200 is lower than that of the dense weaving region 100; applying glue locally along a surface of the dense weaving region 100; and after applying the glue, cutting the dense weaving region 100 according to requirements to form pulling ribs 400, wherein the patterned weaving region 200 between any two adjacent sections of the dense weaving regions 100 is the height of the pulling ribs 400.

It should be noted that, the pulling rib manufacturing process provided in the present embodiment can adopt a new weaving process and a local gluing process, which can save the cost and reduce the weight and avoid material waste on the basis of realizing the manufacturing of the pulling ribs 400. Specifically, the dense weaving region 100 and the patterned weaving region 200 are woven in sequence according to the preset sizes. The woven raw fabric can be made of cotton cloth, polyester cloth or nylon cloth, and the like. In the weaving stage, the dense weaving region 100 and the patterned weaving region 200 are woven according to required size of the product and corresponding widths, and the dense weaving region 100 is used as ends of the pulling ribs 400 to be locally glued, that is, the dense weaving region 100 is respectively connected with a cover cloth 500 and a base cloth 600. By making the weaving density of the patterned weaving region 200 lower than that of the dense weaving region 100, that is, using the patterned weaving region 200 as a height side wall position of the pulling ribs 400, with the low weaving density, the weight of the pulling ribs 400 can be reduced and the ventilation performance can be improved on the basis of ensuring strong toughness of the pulling ribs 400; furthermore, for applying glue locally to the surface of the dense weaving region 100, the glue can be dispensed along an extending direction of the dense weaving region 100. After the gluing is completed, the pulling ribs 400 are formed by cutting the dense weaving region 100, and when the pulling ribs 400 need to be installed to the inflatable product, it only needs to make connection at the glued positions.

Optionally, the way of weaving to form the dense weaving region 100 and the patterned weaving region 200 can be adopted in such a way that weft yarns are arranged in parallel, and warp yarns are woven and formed with the weft yarns by the way of bending in a V-shape in sequence, wherein a weaving edge formed by weaving can be formed by rotating the weft yarns around external warp yarns and returning them back toward the other side, and such weaving edge is wear-resistant, because the weft yarns which are bent back lock the external warp yarns.

The pulling rib manufacturing process provided in the present embodiment includes the following steps: weaving the dense weaving region 100 and the patterned weaving region 200 in sequence according to preset sizes, wherein the weaving density of the patterned weaving region 200 is lower than that of the dense weaving region 100; applying glue locally along the surface of the dense weaving region 100; after applying the glue, cutting the dense weaving region 100 according to requirements to form the pulling ribs 400, wherein the patterned weaving region 200 between any two adjacent sections of the dense weaving regions 100 is height of the pulling ribs 400. By adopting the weaving way and using different weaving densities, the dense weaving region 100 and the patterned weaving region 200 are formed, so that the formed pulling ribs 400 have the advantages of strong toughness, light weight, and ventilation, and the surface of the dense weaving region 100 forming the surfaces of the pulling ribs 400 can also be locally glued, which saves the cost, reduces the weight, avoids the material waste, and solves the technical problems in the prior art that complete gluing to the surfaces of the pulling ribs 400 increases the cost and weight of the inflatable products, and the pulling ribs 400 block the air current circulation and affect the inflating and deflating efficiency.

On the basis of the above embodiment, further, in an embodiment of the present disclosure, the step of applying glue locally along a surface of the dense weaving region 100 further includes: determining a local gluing range according to a range of welding point area set for the inflatable product; locally applying glue to any two adjacent groups of the dense weaving regions 100 symmetrically about a center line of the patterned weaving region 200; and drying the locally applied glue to form a bonding layer 300.

In the present embodiment, according to the size of welding points provided for the inflatable product, two groups of corresponding patterns are glued in the dense weaving region 100, i.e., the glue is locally applied to each dense weaving region 100 in two groups. The two groups are arranged symmetrically about the center line of the dense weaving region 100, the two groups of gluing points can be orderly distributed, and the shapes can be regular shapes or depend on molds. If the glue is applied according to shape of a mold, the mold may have a regular or irregular pattern, and gluing or film width may be different. That is, both the structure and the shape of gluing points can be set on the basis of convenient operation in the manufacturing process.

In an embodiment of the present disclosure, the local gluing includes local point gluing, local line gluing, local surface gluing, local tape-casting or local film pasting.

In the present embodiment, the local gluing can be performed with local point gluing by means of molds at the same time, or the local gluing can be symmetrically applied to two opposite sides of the pulling ribs 400 respectively by means of mold tape-casting.

Optionally, there are also a plurality of options for adhesive materials for local gluing, for example: TPE (thermoplastic elastomer), TPU (thermoplastic polyurethanes), TPR (thermo-plastic-rubber material), TPV (thermoplastic vulcanizate), PVC (polyvinyl chloride), TPO (thermoplastic polyolefin), TPVC (thermoplastic elastomer of polyvinyl chloride), TPVE (phenyl vinyl ether) and EVA (ethylene vinyl acetate), etc., e.g., the local gluing can be local gluing or local film pasting with TPU or PVC.

As shown in FIG. 1-FIG. 4, it should be noted that, for different inflatable products, the pulling ribs 400 may be of various shapes, for example, C-shaped pulling ribs and annular pulling ribs. With regard to a manufacturing process of the C-shaped pulling rib, in an embodiment of the present disclosure, the following steps are further included: weaving to form two sections of the dense weaving regions 100, and weaving the patterned weaving region 200 between the two sections of the dense weaving regions 100; and cutting the two sections of the dense weaving regions 100 to form the C-shaped pulling ribs of a long-strip mesh structure.

In the present embodiment, two sections of the dense weaving regions 100 and one section of the patterned weaving region 200 are used as one stage of breadth cycle, i.e., two sections of the dense weaving regions 100 serve as two ends of each pulling rib 400, wherein one section of the patterned weaving region 200 serves as a height side wall of the pulling rib 400, the two sections of the dense weaving regions 100 can be respectively bent with respect to the patterned weaving region 200, i.e., after the two sections of the dense weaving regions 100 are respectively connected to the cover cloth 500 and the base cloth 600, the patterned weaving region 200 forms exactly the height side wall of the pulling ribs 400. The weight of the pulling ribs 400 can be reduced and the ventilation performance can be improved by means of low weaving density.

In an embodiment of the present disclosure, the step of cutting the dense weaving region 100 according to requirements further includes: weaving the dense weaving region 100 and the patterned weaving region 200 in sequence in an interval weaving manner; cutting along a center line of the dense weaving region 100; and using two sections of the cut dense weaving regions 100 on two opposite sides of the patterned weaving region 200 as the structure of the pulling ribs 400, so as to form the pulling ribs 400 of a long-strip mesh structure.

In the present embodiment, in the cutting process of the C-shaped pulling ribs, in order to ensure the method of cyclic weaving within the breadth, the dense weaving region 100 and the patterned weaving region 200 are woven in sequence in the interval weaving manner, wherein any two adjacent groups of the dense weaving regions 100 have the same width. In order to be capable of ensuring that each pulling rib 400 has the same specification after the cutting, the dense weaving region 100 is cut in the middle, i.e., each pulling rib 400 includes one section of the patterned weaving region 200 and the dense weaving regions 100 symmetrically disposed and cut along the center line, which realizes the manner of cyclic weaving within the breadth when manufacturing a plurality of pulling ribs 400, and improves the weaving efficiency.

With regard to the manufacturing process of the annular pulling rib, in an embodiment of the present disclosure, the following steps are further included: weaving to form three sections of the dense weaving regions 100, and weaving the patterned weaving region 200 between any two adjacent sections of the dense weaving regions 100; forming a first-section dense weaving region 101, a second-section dense weaving region 102, and a third-section dense weaving region 103 by the three sections of the dense weaving regions 100, respectively; cutting along center lines of the first-section dense weaving region 101 and the third-section dense weaving region 103, and equally cutting a local gluing region; edge-sealing the cut first-section dense weaving region 101 and the cut third-section dense weaving region 103 to form an annular pulling rib, wherein one end of the annular pulling rib is respectively the first-section dense weaving region 101 and the third-section dense weaving region 103 after cutting and edge-sealing, and the other end of the annular pulling rib is the second-section dense weaving region 102; and the dense weaving region 100 and the patterned weaving region 200 are woven in sequence in the interval weaving manner to form the cyclic weaving.

In the present embodiment, with regard to the cutting process of the annular pulling rib, in order to ensure the cyclic weaving method within the breadth, the dense weaving region 100 and the patterned weaving region 200 are woven in sequence in the interval weaving manner, wherein any two adjacent groups of the dense weaving regions 100 have the same width. In order to be capable of ensuring that each pulling rib 400 has the same specification after the cutting, three sections of the dense weaving regions 100 and one section of the patterned weaving region 200 are used as one stage of the breadth cycle. Three adjacent sections of the dense weaving regions 100 are named as the first-section dense weaving region 101, the second-section dense weaving region 102, and the third-section dense weaving region 103, wherein the first-section dense weaving region 101 and the third-section dense weaving region 103 are cut in the middle, and then the cut first-section dense weaving region 101 and the cut third-section dense weaving region 103 are aligned and edge-sealed, that is, the first-section dense weaving region 101 and the third-section dense weaving region 103 after the cutting serve as one end of the pulling rib 400, and the integral second-section dense weaving region 102 serves as the other end of the pulling rib 400. The two adjacent sections of the patterned weaving regions 200 serve as two opposite height side walls of the annular pulling rib. After the two ends of the annular pulling rib are respectively connected to the cover cloth 500 and the base cloth 600, two adjacent sections of the patterned weaving regions 200 form exactly the height side wall of the pulling rib 400. By means of the low weaving density, the weight of the pulling rib 400 can also be reduced and the ventilation performance can be improved, wherein during the cutting, the dense weaving regions 100 needs to be cut alternately, so as to satisfy the fact that the two ends of the annular pulling rib are still the width of one section of the dense weaving region 100, thereby realizing the manner of cyclically weaving a plurality of pulling ribs 400 within the breadth, and improving the weaving efficiency.

As shown in FIG. 5-FIG. 9, in an embodiment of the present disclosure, the patterned weaving region 200 is a grid-structure weaving region; alternatively, the patterned weaving region 200 includes the reinforcing ribs 201 and the patterned regions 202 formed by weaving, the patterned regions 202 form hollowed patterned structures, a plurality of reinforcing ribs 201 are provided, and the reinforcing ribs 201 are woven along edges of the patterned regions 202.

In the present embodiment, the patterned weaving region 200 between any two adjacent sections may be of various structures, for example, in a first type, no pattern is manufactured, the weaving region is formed by a grid structure, and grids may be square or diamond; in a second type, a unit pattern is formed by weaving dense lines, wherein unit arrays, symmetrical and rotating patterns and so on are orderly arranged or freely arranged to form patterns, and the reinforcing ribs 201 are added in combination with the pattern according to stress condition; and in a third type, for regular patterns, each or several groups can be directly hollowed out, and woven lines, i.e. reinforcing ribs 201, are added to the hollowed-out edges, and the number of groups of reinforcing ribs 201 is not less than the number of patterns. Through the weaving setting for the patterned weaving regions 200, the density of weaving lines, increasing the reinforcing ribs 201 and the patterned regions 202, and increasing the strong toughness of the pulling ribs 400, any shape can be hollowed out in appropriate positions, to reduce the weight of the pulling ribs 400 and improve the ventilation performance.

As shown in FIG. 1-FIG. 14, the pulling rib provided in the present embodiment is obtained by manufacturing with the pulling rib manufacturing process. Since the technical effect of the pulling rib 400 provided in the present embodiment is the same as that of the pulling rib manufacturing process provided in the above embodiments, it is not repeated herein.

Figure 12:
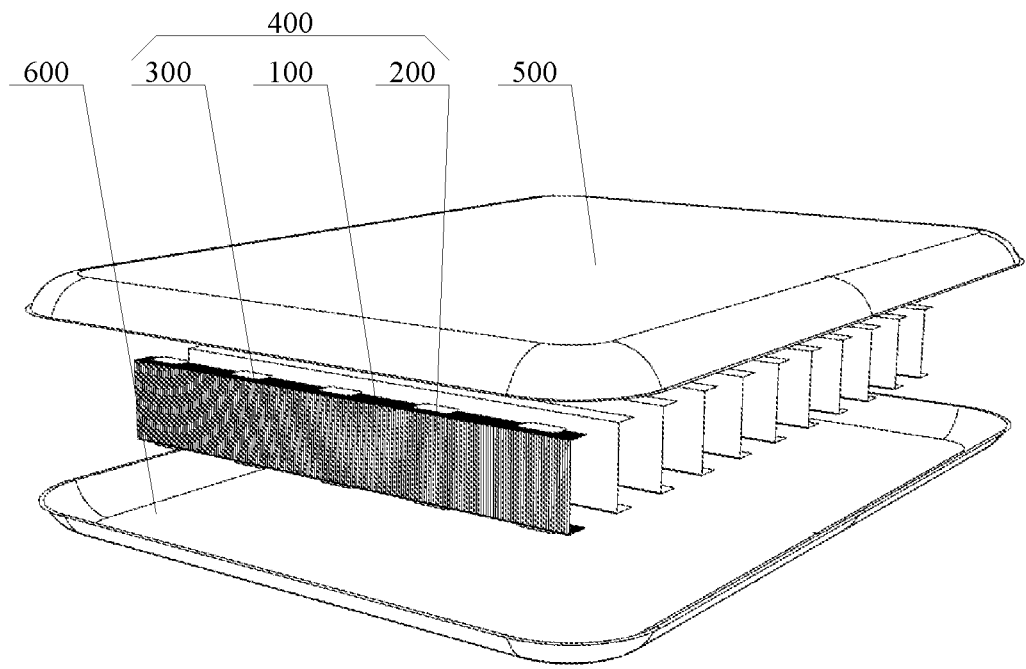
FIG. 12 is a structural schematic diagram of an inflatable product equipped with the C-shaped pulling ribs provided in an embodiment of the present disclosure.
Figure 13:
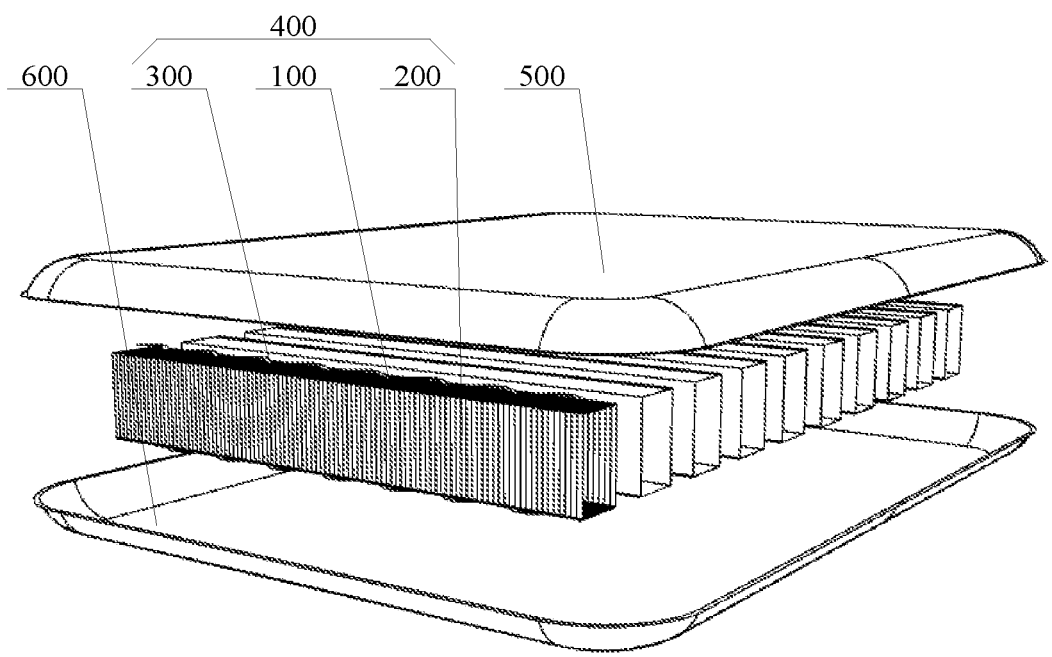
FIG. 13 is a structural schematic diagram of an inflatable product equipped with the annular pulling ribs provided in an embodiment of the present disclosure.
Figure 14:
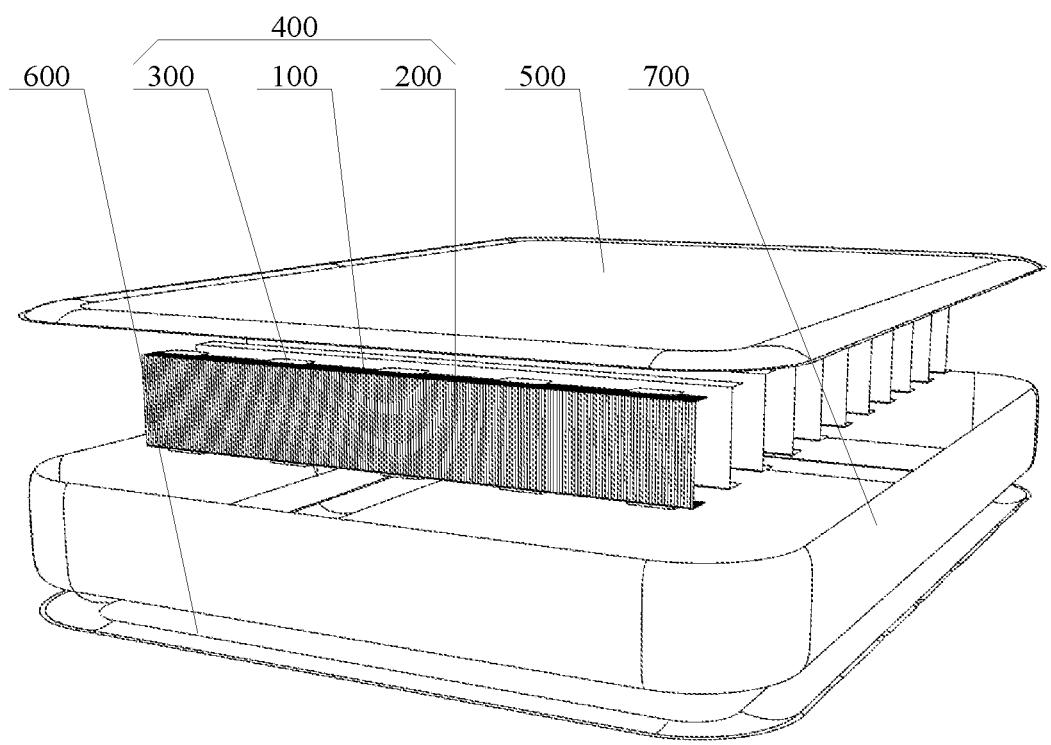
FIG. 14 is a structural schematic diagram of an inflatable product equipped with a side wall provided in an embodiment of the present disclosure.

As shown in FIG. 12-FIG. 14, an inflatable product provided in the present embodiment includes: a cover cloth 500, a base cloth 600, and the pulling rib 400; the pulling rib 400 is located between the cover cloth 500 and the base cloth 600, gluing layers are provided at intervals along surfaces of two sides of the pulling rib 400, and the pulling rib 400 is connected with the cover cloth 500 and the base cloth 600 respectively through the gluing layers on the two sides by a hot welding process; and a plurality of pulling ribs 400 are provided, and the plurality of pulling ribs 400 are provided at intervals along an extending direction perpendicular to the pulling ribs 400.

In an embodiment of the present disclosure, a side wall 700 is further included; the side wall 700 is circumferentially disposed along an edge of the cover cloth 500, the side wall 700 is connected to the cover cloth 500 and the base cloth 600, respectively, and an inflation space for accommodating the pulling ribs 400 is formed by the cover cloth 500, the side wall 700, and the base cloth 600.

Optionally, since the pulling rib 400 mainly serves to support and shape, in order to make the inflatable product provided in the present embodiment have a more stable shape that is not easily deformed, a plurality of pulling ribs 400 can be arranged at intervals between the cover cloth 500 and the base cloth 600.

In the present embodiment, the pulling rib 400 is applied to an inflatable mattress, wherein both the cover cloth 500 and the base cloth 600 can adopt TPU coated sheet of fabric, which is environmentally friendly and wear-resistant and suitable for a variety of outdoor environments; by providing a plurality of C-shaped pulling ribs or annular pulling ribs manufactured by the above process between the cover cloth 500 and the base cloth 600, the support of the side wall 700 also can be provided in the same series. Through uniform arrangement at intervals, the two opposite sides of the pulling rib 400 are respectively in hot-melt connection with the cover cloth 500 and the base cloth 600 through the locally glued positions, then welding points of the inflated inflatable bed are recessed downward, while other places are bulged up, so that a plurality of patterns are formed on the surface of inflatable mattress, and meanwhile act as pillars. The technical effects of rapid inflating and deflating and convenient to carry are realized by providing an air valve on the inflatable mattress. Through practical applications of the C-shaped pulling rib or annular pulling rib formed by the above pulling rib manufacturing process provided in the above embodiments, the pulling rib 400 has a light weight and the ventilation effect, then faster inflation and deflation is ensured, and the efficiency is improved.

Finally, it should be noted that various embodiments in the above are only used to illustrate the technical solutions of the present disclosure, but not to restrict it; although the present disclosure is described in detail with reference to various preceding embodiments, those ordinary skilled in the art should understand that they still could modify the technical solutions recited in various preceding embodiments, or replace some or all of the technical features with equivalents; these modifications or replacements do not make the essence of the corresponding technical solutions depart from the scope of the technical solutions of embodiments of the present disclosure.

What is claimed is:

1. A pulling rib manufacturing process, comprising steps of:
    weaving a first weaving region and a patterned weaving region in sequence according to preset sizes, wherein a weaving density of the patterned weaving region is lower than that of the first weaving region;
    applying glue locally along a surface of the first weaving region; and
    after applying the glue, cutting the first weaving region to form pulling ribs, wherein the patterned weaving region between any two adjacent sections of the first weaving region is a height of the pulling ribs.

2. The pulling rib manufacturing process according to claim 1, wherein the step of applying glue locally along a surface of the first weaving region further comprises:
    determining a local gluing range according to a range of a welding point area set for an inflatable product;
    locally applying glue to any two adjacent groups of the first weaving region, symmetrically about a center line of the patterned weaving region; and
    drying the locally applied glue to form a bonding layer.

3. The pulling rib manufacturing process according to claim 2, further comprising steps of:
    weaving to form two sections of the first weaving region, and weaving the patterned weaving region between the two sections of the first weaving region; and
    cutting the two sections of the first weaving region to form C-shaped pulling ribs of a long-strip mesh structure.

4. The pulling rib manufacturing process according to claim 2, further comprising steps of:
    weaving to form three sections of the first weaving region, and weaving the patterned weaving region between any two adjacent sections of the first weaving region;
    forming a first-section weaving region, a second-section weaving region, and a third-section weaving region by the three sections of the first weaving region, respectively;
    cutting along center lines of the first-section weaving region and the third-section weaving region, and cutting a local gluing region at equal intervals;
    edge-sealing a cut first-section weaving region and a cut third-section weaving region to form an annular pulling rib, wherein one end of the annular pulling rib consists of the first-section weaving region and the third-section weaving region after the cutting and the edge-sealing, and the other end of the annular pulling rib is the second-section weaving region; and
    weaving the first weaving region and the patterned weaving region in sequence in an interval weaving manner to form a cyclic weaving.

5. The pulling rib manufacturing process according to claim 2, wherein the local gluing comprises local point gluing, local line gluing, local surface gluing, local tape-casting or local film pasting.

6. The pulling rib manufacturing process according to claim 5, further comprising steps of:
    weaving to form two sections of the first weaving region, and weaving the patterned weaving region between the two sections of the first weaving region; and
    cutting the two sections of the first weaving region to form C-shaped pulling ribs of a long-strip mesh structure.

7. The pulling rib manufacturing process according to claim 5, further comprising steps of:
    weaving to form three sections of the first weaving region, and weaving the patterned weaving region between any two adjacent sections of the first weaving region;
    forming a first-section weaving region, a second-section weaving region, and a third-section weaving region by the three sections of the first weaving region, respectively;

cutting along center lines of the first-section weaving region and the third-section weaving region, and cutting a local gluing region at equal intervals;

edge-sealing a cut first-section weaving region and a cut third-section weaving region to form an annular pulling rib, wherein one end of the annular pulling rib consists of the first-section weaving region and the third-section weaving region after the cutting and the edge-sealing, and the other end of the annular pulling rib is the second-section weaving region; and weaving the first weaving region and the patterned weaving region in sequence in an interval weaving manner to form a cyclic weaving.

8. The pulling rib manufacturing process according to claim 1, further comprising steps of:

weaving to form two section of the first weaving region, and weaving the patterned weaving region between the two sections of the first weaving region; and cutting the two sections of the first weaving region to form C-shaped pulling ribs of a long-strip mesh structure.

9. The pulling rib manufacturing process according to claim 8, wherein the step of cutting the first weaving region further comprises:

weaving the first weaving region and the patterned weaving region in sequence in an interval weaving manner;

cutting along a center line of the first weaving region; and using two sections of cut first weaving region on two opposite sides of the patterned weaving region as a structure of the pulling ribs, so as to form the pulling ribs of the long-strip mesh structure.

10. The pulling rib manufacturing process according to claim 1, further comprising steps of:

weaving to form three sections of the first weaving region, and weaving the patterned weaving region between any two adjacent sections of the first weaving region;

forming a first-section weaving region, a second-section weaving region, and a third-section weaving region by the three sections of the first weaving region, respectively;

cutting along center lines of the first-section weaving region and the third-section weaving region, and cutting a local gluing region at equal intervals;

edge-sealing a cut first-section weaving region and a cut third-section weaving region to form an annular pulling rib, wherein one end of the annular pulling rib consists of the first-section weaving region and the third-section weaving region after the cutting and the edge-sealing, and the other end of the annular pulling rib is the second-section weaving region; and weaving the first weaving region and the patterned weaving region in sequence in an interval weaving manner to form a cyclic weaving.

11. The pulling rib manufacturing process according to claim 1, wherein the patterned weaving region is a mesh-weaving-process-structure region.

12. The pulling rib manufacturing process according to claim 1, wherein the patterned weaving region comprises reinforcing ribs and patterned regions formed by weaving, the patterned regions form hollowed patterned structures, a plurality of reinforcing ribs are provided, and the reinforcing ribs are woven along edges of the patterned regions.

* * * * *